United States Patent

[11] 3,617,373

[72] Inventor James H. Mott
Bath, Pa.
[21] Appl. No. 731,899
[22] Filed May 24, 1968
[45] Patented Nov. 2, 1971
[73] Assignee Western Electric Company, Incorporated
New York, N.Y.

[54] METHODS OF MAKING THIN FILM PATTERNS
3 Claims, 8 Drawing Figs.

[52] U.S. Cl. .......... 117/212,
117/5.5, 117/107, 117/119, 204/192
[51] Int. Cl. .......... B44d 1/18,
C23c 15/00, C23c 13/02
[50] Field of Search .......... 117/212,
106, 5.5, 38, 119, 107; 204/192

[56] References Cited

UNITED STATES PATENTS

| | | | |
|---|---|---|---|
| 3,355,320 | 11/1967 | Spriggs et al. | 117/5.5 |
| 3,406,043 | 10/1968 | Balde | 117/212 |
| 3,262,900 | 7/1966 | Schreiber | 117/212 X |
| 3,110,102 | 11/1964 | Pfefferkorn | 117/5.5 X |
| 3,109,228 | 11/1963 | Dyke et al. | 117/5.5 X |
| 3,075,860 | 1/1963 | Veres | 117/212 X |

*Primary Examiner*—Alfred L. Leavitt
*Assistant Examiner*—Alan Grimaldi
*Attorneys*—H. J. Winegar, R. P. Miller and J. L. Landis

ABSTRACT: Deposition of patterned thin-films of metal or metal compounds on a substrate is accomplished using a dissolvable glaze-frit mask. The frit, in pasty form, is applied to the substrate in a negative pattern. After the frit is hardened by heating, the film is deposited over the surface, including the substrate and frit pattern. The frit is then removed with a selective solvent. The layer of film overlying the frit is removed with the frit to leave the desired film pattern on the substrate.

INVENTOR.
J.H. MOTT
BY
J. L. Landis
ATTORNEY

METHODS OF MAKING THIN FILM PATTERNS

BACKGROUND OF THE INVENTION

This invention relates to the fabrication of patterned thin films of metal or metal compounds and, more particularly, to the fabrication of patterned thin-film circuitry on a substrate using a dissolvable glaze-frit mask.

The increasing complexity of modern electronic systems has produced an unprecedented demand for miniaturization of products and systems. This is the result of a need for increased reliability and performance coupled with decreased cost, size and weight. There are a number of approaches to miniaturization. One is the progressive miniaturization of conventional discrete components. A second approach employs semiconductor material, along with epitaxal and diffusion processes, to provide active as well as passive devices. A third approach, the manufacture of thin-film devices, utilizes thin layers of material deposited onto an insulating substrate to form components and associated interconnections.

Thin film circuits, which possess a higher volumetric efficiency or packing density than conventional circuits or printed circuits with conventional components, generally include a film-type conductor network and a plurality of film-type, passive electrical components, such as resistors and capacitors, formed in situ on a common substrate. These thin films, which are of the order of 300 to 30,000 angstroms thick, are formed by a vacuum-deposition technique. The expression "vacuum deposition" as used herein is meant to include evaporation, sputtering and other equivalent "condensation" techniques.

In tantalum thin-film circuitry, for example, capacitors and resistors are produced in a single pattern of tantalum. This simplifies materials and processes and aids miniaturization and reliability. Normally, rudimentary interconnections are also developed in the original pattern, to which gold or other more conducting material can be later added. The resistance values of the resistors are determined by the thickness and geometric configuration of the deposited film. Although precise values can be achieved by a number of methods, one of the most practical is electrochemical anodization. Anodization reduces the cross section of the metal thereby increasing the resistance. Suitable monitoring can be used to obtain exact resistance values. In manufacturing the capacitors, the metal film initially deposited is used as one electrode. The dielectric can be made by controlled surface oxidation of the metal or by the separate deposition of an oxide film. Since the capacitance value is inversely proportional to the dielectric thickness, the oxide thickness is carefully controlled to obtain the required capacitance tolerance. The third element, the counterelectrode, is formed by depositing a metal on top of the oxide. The capacitor is then complete, except for the attachment of leads.

Tantalum is a particularly useful metal for thin-film circuits. It is stable and has a medium resistivity suitable for making both resistors and capacitors. In addition, the tantalum oxide formed during anodization has a high-dielectric constant and high-dielectric strength. Thus, it may readily be used in the production of capacitors, where the metal is used as one electrode and the oxide as the dielectric. Other suitable metals include aluminum, chromium, nickel, tin, titanium, gold, cadmium and palladium as well as mixtures of these metals. In some instances, metal compounds are preferred, such as tantalum nitride used in the manufacture of thin-film resistors, as described in the patent to D. Gerstenberg U.S. Pat. No. 3,242,006.

The selection of a suitable substrate, which must be dimensionally stable at 400° C. in a vacuum, is important to the manufacture of thin-film devices. The most significant characteristics of substrates are (1) surface smoothness, (2) proper chemical composition, and (3) thermal conductivity. Although not essential to the same degree for resistors as for capacitors, smooth surfaces favor reproducibility of sheet resistivity and the definition of fine lines. The best surfaces for capacitors are drawn or fused surfaces such as those of drawn glass, fused silica or glazed ceramic, although well-polished surfaces of materials such as pyrex, quartz, and sapphire can be used. It is possible for one side of drawn glass to be satisfactory and the other side unsatisfactory. Moreover, drawn sheets may exhibit a gentle waviness in the direction of draw which can seriously affect the fit of mechanical or photographic masks.

It is also important that the substrate does not interact with the film. Soda lime glass, for example, is not suitable for use under high DC power because the sodium ions migrate to the negative terminal causing deterioration of film. Other compositional factors, such as reactions to specific etchants and electrolytes, must be considered when pattern generation is accomplished by a technique involving photolithography.

The thermal conductivity of the substrate must also be considered. For example, the difference in aging on resistors on glazed alumina and on glass is believed to result primarily from difference in temperature due to the high thermal conductivity of alumina. Despite the importance of thermal conductivity, low-alkali glass is an important substrate material. Glass is favored by low cost and ease of division of large sheets into small single circuit sizes. Alumina and beryllia predominate where the highest loads and most severe stability requirements are encountered.

The preferred methods for depositing film are vacuum evaporation and cathode sputtering. The principal difference between these techniques is that, while thermal energy is used in evaporation procedures for evaporating the coating material, high-voltage ion bombardment of the coating material, causing ejection of atoms, is used for sputtering. Thus, thin films of more refractory materials may be deposited by sputtering.

Vacuum evaporation makes use of a vacuum chamber which has been pumped down to a pressure of approximately $1\times10^{15}$ mm. of mercury. The charge (evaporant) is then heated until its vapor pressure exceeds the pressure of the vacuum system, at which point it vaporizes rapidly. It is propagated rectilinearly from the source and condensed onto the cooler surrounding surfaces.

The cathode sputtering process uses a low-pressure glow discharge maintained between two electrodes. The cathode, made from the material to be deposited, is bombarded by positively charged gas ions, usually argon. Atoms of cathode material are ejected and deposited on suitably located substrates.

The deposition of good film in the desired pattern is the key to the production of reliable devices. Accordingly, the circuit patterns formed from thin-films require a high degree of accuracy and precision to achieve the close tolerances required of the electrical characteristics.

Within limitations, mechanical masks have been used to delineate patterns. The masks are fabricated from metals such as stainless steel, molybdenum or nickel and must be made extremely thin in order to minimize shadowing. Shadowing, i.e., the irregular deposition of metal, occurs when a mask is too thick or metal builds up on the mask. Shadowing may cause: (1) the deposited metal to be of irregular width and nonadherent; (2) the deposited metal to be of irregular thickness and varying resistance value; and (3) electrical noise. In addition, a problem is encountered in holding the masks during deposition such that good contact is maintained across the substrate surface. The requirement for a close fit of mask to substrate is more critical for sputtered films. Sputtered atoms have a greater tendency to form diffuse edges than evaporated atoms due to the broad source and the scattering of some fractions of the sputtered atoms. Substrates have been cracked while attempting to obtain a close fit of the mask to the substrate.

Several techniques have been used to generate patterns by photolithography—a process which is both tedious and costly. For example, when "direct photoetching" is employed, the substrate is first completely coated with metal or a metal compound and is then covered with a thin layer of a photosensitive emulsion, usually referred to as "resist." The substrate is spun or whirled using a turntable to produce a uniform coating. It is then oven baked to set the resist properly. Since the emulsion is photosensitive care must be taken to avoid premature exposure. This emulsion is then exposed to an ultraviolet light source through a negative of the desired pattern, which exposure polymerizes the emulsion in the particular area exposed to light. After the remainder of the emulsion is washed away the substrate is again baked to remove all traces of solvent and to harden the resist. The metal deposit can then be etched selectively. The favored etching solutions contain hydrofluoric acid; hence, when direct etching is used, there is some substrate attack in the area surrounding the metal or metal compound pattern if it is on glass, glazed ceramics, or other substrates susceptible to HF. Electrochemical removal of the metal or metal compound in a methanolic aluminum-chloride solution prevents the attack on the substrate but the undercutting may be quite severe. After the pattern generation is complete, the remaining resist must be removed. Because of its resistance to attach by solvents, which was advantageous earlier in the process, the removal of the residual resist becomes a problem. Often prolonged soaking in a suitable solvent, supplemented by mechanical abrasion, is required.

The use of a metal oxide layer formed on the substrate surface prior to all other operations has been used to minimize attack on the substrate by the etchant. In accordance with this oxide-underlay technique, the substrate is coated with 100 to 500 angstroms of metal which is then oxidized in air at 500°–600° C. for an hour or until oxidation is complete. Alternatively, reactively sputtered or totally anodized films have been used. This oxide-coated material is then used as a substrate for direct photo etching.

Another method of pattern formation is "rejection masking." According to this technique, a film of an easily etchable metal such as copper or aluminum is first applied to the substrate and in this an opening is revealed by photoetching away the material corresponding to the desired pattern. Metal such as tantalum is sputtered over the entire surface. The coated substrate is then immersed in an etchant for the first metal. This metal dissolves away and frees the overlying tantalum, leaving tantalum only where required. Mild etchants are required to prevent attack on the substrate.

If the metal such as uniform is thin enough so that it can be anodized completely through, then, instead of using an etching solution after the photoresist is developed, an electrolyte and DC potential may be used to anodize through all of the metal in the open area. However, unless the tantalum thickness is very uniform, there is the problem of leaving islands of unconverted tantalum.

It has also been suggested that aluminum can be used to assist in obtaining a tantalum pattern. In one case, aluminum is deposited over the surface of the tantalum-coated substrate. Next, using a selective etch with photolithographic techniques, aluminum is removed from the area containing the undesired tantalum. Then an electrolyte suitable for both tantalum and aluminum is used and the whole sheet is anodized until the tantalum is completely converted in the open area. Provided the aluminum has been deposited in sufficient thickness so that it does not anodize through, it may now be removed with a mild etchant, leaving the bare tantalum in the desired pattern.

In an alternate process, use is made of the fact that tantalum oxide is scarcely attacked by the normal etching agents for tantalum. After applying somewhat more tantalum than required, and after overlaying this with aluminum, by selective etch the aluminum is removed from the area containing the desired pattern of tantalum; this is then anodized to some modest potential, such as 25 volts, using a compatible electrolyte and the aluminum is removed with a mild etch. Next a fluoride etch is used, and the oxide over the area containing the desired tantalum pattern acts as a resist preventing attack on this area.

SUMMARY OF THE INVENTION

Accordingly, an object of the present invention is to provide a new and improved, relatively inexpensive method for the deposition of patterned thin films of metal or metal compounds on a substrate.

Another object of the invention is to provide a disposable, easily removable mask which can be mounted in firm contact with the substrate during a vacuum deposition operation and which will yield an adherent metal pattern upon removal of the mask.

In accordance with the present invention, a pasty, glaze-frit material is selectively applied, e.g., by silk screening, onto a substrate in a desired negative pattern and heated sufficiently to harden or set the frit material. Vacuum deposition is then employed to deposit metal or a metal compound over the entire substrate, coating both the frit mask and the substrate. The deposited metal is discontinuous thereby permitting a solvent selected for the hardened frit, such as xylene or trichloroethylene, to contact and remove the frit. Removal of the frit also removes the overlying metal or metal compound in that area leaving the film deposited on the unmasked area of the substrate in the desired pattern.

BRIEF DESCRIPTION OF THE DRAWINGS

Other objects, advantages, features and aspects of the invention will be more readily understood from the following detailed description of specific embodiments and examples thereof, when considered in conjunction with the drawings in which.

Figure 1:
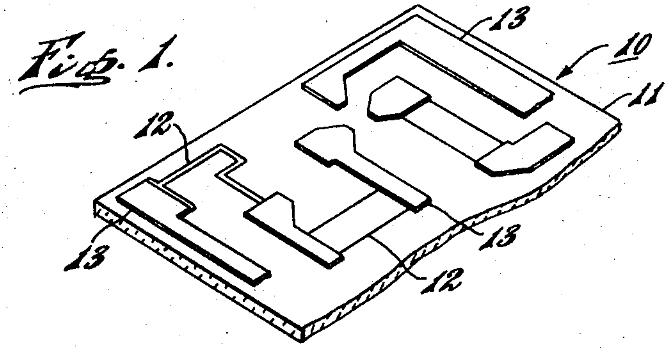
FIG. 1 is a perspective view of a portion of an illustrative thin film circuit, embodying resistors and conductors deposited on a substrate.

It should be understood that the vertical dimensions in the drawings are greatly exaggerated for the sake of clarity of illustration.

DESCRIPTION OF THE PREFERRED EMBODIMENTS

Referring first to FIG. 1, a portion of a typical thin-film circuit 10 which can be manufactured in accordance with the invention is illustrated. The circuit includes an electrically nonconductive substrate 11, such as glass or ceramic, on which a plurality of thin-film resistors 12—12 and thin-film conductors 13—13, have been formed in a desired pattern. In specific examples, the resistors may be formed of tantalum nitride, as disclosed in D. Gerstenberg U.S. Pat. No. 3,242,006, and the conductive paths of a three-layer sandwich of a nickel-chromium alloy (Nichrome), copper and palladium in that order, as disclosed in a commonly assigned, copending application of R. F. Brewer and B. Piechocki, Ser. No. 557,743, filed Sept. 7, 1966, now U.S. Pat. No. 3,365,909. Further details of the manufacture and processing of this type of circuit are disclosed in an article by McLean et al. entitled "Tantalum-Film Technology," Proceedings Of The IEEE, Vol. 52, No. 12, Dec. 1964, pp. 1450–1462.

Figure 2A:
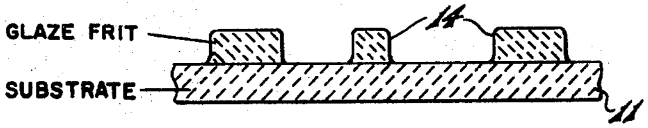
FIGS. 2A to 2C are a series of fragmentary sectional views illustrating various steps in a method of fabricating a patterned thin film by vacuum deposition.
Figure 2B:
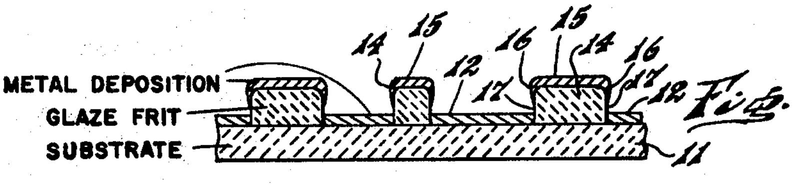
Figure 2C:
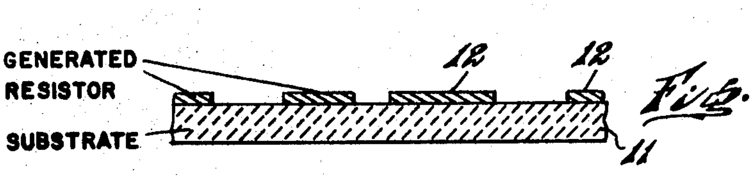

In a first embodiment of the invention, illustrated in FIGS. 2A–C, the method of this invention is used to form a patterned film of tantalum nitride, preferably corresponding to the formula $Ta_2N$, on the substrate 11 to form a resistor pattern 12—12 as shown in FIG. 2C. This is accomplished by first selectively applying a dissolvable glaze-frit material to a 0.030-inch-thick substrate 11 in the desired negative pattern shown in FIG. 2A, forming a glaze-frit mask 14—14 about 0.001 inches thick. Advantageously, the glaze-frit material, composed of a pasty mixture of glass-forming oxides and a suitable organic binder and vehicle, such as described, in example I, is applied by conventional screening techniques. After screening, the glaze-frit mask 14—14 is heated to a relatively low temperature sufficient to set or harden the frit material (approximately 100° C. in the specific example give herein).

A thin film of tantalum nitride 12—12 and 15—15 1,000 angstroms thick is then deposited onto the substrate 11 and the glaze-frit mask 14—14, respectively, by sputtering, producing the structure shown in FIG. 2B. Because of the steepness of the sides 16—16 of the glaze-frit mask 14—14 the "bombardment" of these sides 16—16 is unequal. This results in an unevenly deposited film with discontinuities 17—17 at the junctures of the glaze-frit mask 14—14 with the deposited tantalum nitride 12—12 and thin spots along sides 16—16.

The final step involves the removal of the hardened glaze-frit mask 14—14, together with the overlying thin film of tantalum nitride 15—15 which has been deposited on the frit material during the sputtering operation. This is accomplished by treating the deposited film with a selective solvent for the hardened frit, but not for the deposited metal or the substrate, preferably by immersing the unit in an agitated bath of the solvent. Preferred solvents for the frit of example I are xylene and trichloroethylene. Preferably, the bath is ultrasonically agitated to assist in removing the frit materials. The discontinuities 17—17 and thin spots along sides 16—16 provide access for the solvent to the glaze-frit material. Removal of the glaze frit mask 14—14 also causes the removal of the overlying metal film 15—15, leaving generated resistor 12—12 of a desired pattern on the substrate as shown in FIG. 2C.

After the desired resistor pattern is generated the tantalum resistors are anodized; other metals are deposited to complete internal circuit wiring and to cover the areas which will ultimately be used as contacts; and leads are attached in order to complete the thin-film device. General procedures for accomplishing these steps are disclosed in an article by Reichard entitled "A Survey Of Thin-Film Manufacture," The Western Electric Engineer, Vol. VII, No. 2, Apr. 1963.

In general, the thickness of the glaze-frit material is between 0.0005 and 0.003 inches. This thickness can be compared to the thickness of the substrate, which is normally between 0.025 and 0.045 inches thick, and the thickness of the thin-film which is deposited by vacuum deposition, 300- to 30,00-angstroms-thick and typically between 500 to 20,000 angstroms in thickness. The frit mixture may consist of various combinations of glaze-forming, inorganic oxide particles, together with an organic binder such as ethyl cellulose and a selected vehicle or solvents to form a pasty mixture which is thin enough to be applied in the desired pattern, yet sufficiently thick to hold its shape. It is believed that the relatively low-temperature-hardening step (such as heating at 100° C.) drives off the major portion of the vehicle, leaving a hardened mass, constituting the mask and consisting of the oxide particles suspended in a matrix of the binder plus any residual decomposition products from the vehicle. Normally, the glaze frit material is hardened or set after being deposited by heating the frit material to a temperature between 100° and 200° C. Lower temperatures can be employed, providing the frit material is sufficiently set during the vacuum deposition. Higher temperatures can also be used, but are generally not necessary. The solvent, such as xylene or trichloroethylene, dissolves the binder and agitation assists by operating on the weak bond between the substrate and the hardened frit to float away the frit.

Figure 3A:
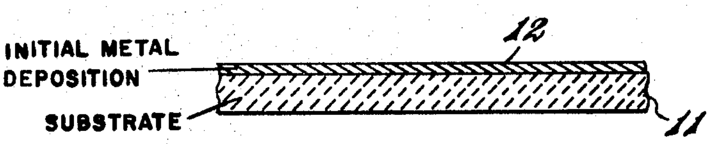
FIGS. 3A to 3D are a series of fragmentary sectional views illustrating various steps in a method of fabricating a patterned thin film by vacuum deposition, according to a second embodiment of the invention.
Figure 3B:
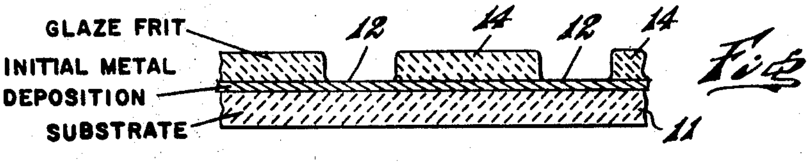
Figure 3C:
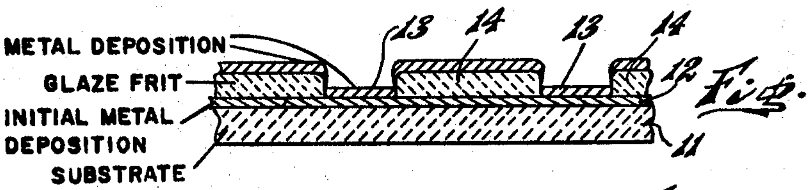
Figure 3D:
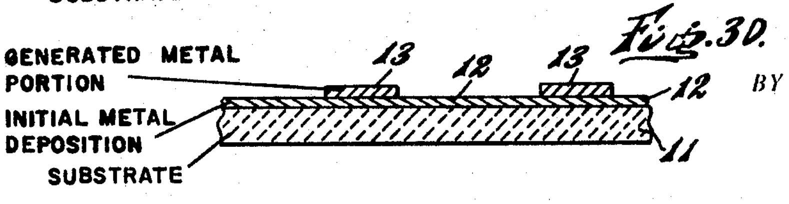

In a second embodiment of the invention, illustrated in FIGS. 3A–D, the method of this invention is used to form a conductor film pattern 13—13 as shown in FIG. 3D. In accordance with this embodiment, an initial deposit of tantalum nitride is applied to the substrate 11 by sputtering to obtain the thin layer of film 12 shown in FIG. 3A. This may be either a patterned film deposited with a glaze-frit mask in accordance with the first embodiment of the invention, or an area film sputtered in accordance with standard procedures–to be etched later to form the desired resistor pattern. The latter is illustrated for convenience in explanation.

Once the initial layer of tantalum nitride has been deposited the procedure for generating the film pattern 13—13 shown in FIG. 3D is substantially identical to the procedure set forth in connection with the embodiment illustrated by FIGS. 2A–C. Specifically, a dissolvable glaze-frit material is selectively applied to the tantalum nitride film 12 to obtain the glaze-frit mask 14—14 shown in FIG. 3B. Following temperature hardening of the frit material, vacuum deposition is employed to deposit 500 angstroms of an alloy of 80 percent nickel and 20 percent chromium onto the tantalum-nitride-coated substrate. The resultant surface is depicted by FIG. 3C. The final step involves the removal of the glaze-frit mask 14—14 with a solvent to obtain a nickel-chromium film 13—13, having the pattern shown in FIG. 3D.

It will be understood that after the alloy of nickel and chromium is deposited, as illustrated in FIG. 3C, and before the frit mask is removed, it is possible to deposit successive layers of other metals, such as copper and palladium, by vacuum deposition. Thus, the present invention can be used to generate contact pads such as those disclosed in the commonly assigned, copending application of Brewer and Piechocki, Ser. No. 557,743, filed Sept. 7, 1966, now U.S. Pat. No. 3,365,909.

A fuller understanding of the invention will be obtained from the following examples. It is to be understood that these examples are for illustrative purposes only and are not intended as limiting.

EXAMPLE I

Glaze frit was squeegeed through a 200-mesh silk screen onto a ceramic substrate to obtain a desired resistor pattern and then hardened by heating the frit material to 100° C. The glaze frit comprised a mixture of 32 percent by weight silicon dioxide, 14 percent by weight barium oxide, 20 percent by weight lead oxide, 2 percent by weight aluminum oxide, 5 percent by weight calcium oxide, 5 percent by weight boron oxide, 1 percent by weight potassium oxide, 1 percent by weight sodium oxide, 2 percent by weight ethyl cellulose, 10 percent by weight alpha terpineol, 5 percent by weight beta terpineol, 1 percent by weight terpene hydrocarbons and 2 percent by weight of other tertiary alcohols boiling in the alpha terpineol range.

A Veeco (bell jar)-sputtering system was employed to deposit about 1,000 angstroms of tantalum nitride onto the glaze-frit-coated substrate under the following conditions:

| | |
|---|---|
| Substrate preheat temperature | 500° C. C. |
| Voltage | 6,200 volts |
| Current | 300 ma. |
| Bell jar pressure | 25 microns |
| Foreline pressure | 100 microns |
| Sputtering time | 4 minutes |
| Cathode to substrate distance | 3.5 inches |
| Cathode diameter | 14 inches |

The glaze frit, which fires at 1,000 C., did not break down or outgas while inside the high-vacuum system. Following the termination of the sputtering operation, the glaze-frit material and unwanted tantalum nitride coating the glaze frit were removed with 10 seconds by placing the coated substrate in an ultrasonically agitated xylene bath.

The same sputtering technique was then employed to coat an identical substrate used as the control sample. This control sample was processed using the direct photoetch method to obtain a resistor pattern similar to the resistor pattern obtained with the glaze-frit technique.

The results obtained using the respective glaze-frit and photoetch techniques are shown below:

| Technique | Sheet Resistance (ohms/square) | Temperature Coefficient of Resistance (p.p.m./°C.) | Bulk Resistivity (microohm cms.) |
|---|---|---|---|
| Glaze frit | 48 | −38 | 420 |
| Photoetch | 52 | −45 | 442 |

EXAMPLE II

Glaze frit, having the composition set forth in example I, was applied to a ceramic substrate using a 200-mesh silk screen to obtain a mask of the desired negative pattern and then hardened by heating the frit material to 100° C.

Using the evaporation procedure for vacuum deposition, 500 angstroms of Nichrome (an alloy of nickel and chromium), 10,000 angstroms of copper and 4,000 angstroms of palladium were deposited on the glaze-frit coated substrate. The glaze-frit material, together with unwanted metal coating the glaze frit, was then removed from the substrate in an ultrasonically agitated xylene bath.

The pattern obtained using the glaze-frit technique exhibited good adherence when subjected to a Scotch-tape test.

When evaporating metals with the glaze-frit mask onto glass or glazed ceramic substrates, it is desirable to preheat the substrate in the vacuum chamber to a temperature of about 200°–250° C., in order to insure good adherence and line definition. This is not essential with unglazed ceramic substrates.

EXAMPLE III

Glaze frit, having the composition set forth in example I, was selectively applied to a glass substrate and then dried at 100° C. for 5 minutes.

A thin film of tantalum was then generated by sputtering the tantalum film over the glaze-frit mask onto the substrate under the following conditions in an argon-nitrogen atmosphere:

Substrate preheat temperature 400° C.
Current density 1.85 ma./in.$_2$
Voltage 3,800V
Bell jar pressure 20 microns
Foreline pressure 120 microns
Sputtering time 9 minutes
Cathode to substrate distance 2.5 inches The coated substrate was then treated with xylene to remove the glaze frit and unwanted overlying metal.

The following table compares the results obtained using the glaze-frit procedure set forth above with the results obtained using identical conditions to produce a control sample by the direct photoetch technique.

| Technique | Sheet resistance (ohms/square) | Temperature coefficient of resistance (p.p.m./° C.) | Bulk resistivity (microohm centimeters) | Adherence ("Scotch" tape test) |
|---|---|---|---|---|
| Photoetch | 24 | −68 | 560 | Good. |
| Glaze frit | 25.5 | −89 | 568 | Do. |

EXAMPLE IV

Glaze frit, having the composition set forth in example I and a viscosity of 180,000 centipoises, was selectively applied through a 325-mesh silk screen onto nine separate ceramic substrates. After screening, these substrates were heated at 100° C. for 2 minutes.

The nine substrates, identified above, were loaded into an evaporator with six identical substrates on which a mechanical mask had been mounted. Successive layers of Nichrome, copper and palladium were evaporated into the 15 substrates. The nine frit-coated substrates were then cleaned in an ultrasonic bath of trichloroethylene which removed the glaze frit and unwanted overlying metal. The mechanical masks were removed from the remaining six substrates. No failures were noted on any of the substrates when tested with Scotch tape.

Similar results were obtained in sputtering palladium contact areas onto tantalum nitride resistor films, or directly onto ceramic substrates.

Upon visual inspection, it was seen that the definition of the frit-coated substrates was far superior to the definition of the substrates which had been coated using mechanical masks. This results from the fact that mechanical masks cannot be maintained in intimate contact over the entire substrate. In addition, alignment was improved for the substrates using the glaze-frit masks since these masks were controlled by fixturing rather than depending on human error associated with the positioning of mechanical masks.

Thus, in accordance with the present invention, the deposition of patterned thin-films of metal on a substrate is accomplished using a disposable glaze-frit mask. One or more layers of metal can be applied in this manner to generate well-defined, adherent patterns. The use of disposable glaze-frit masks is not only faster than photoetch procedures for the generation of thin-film patterns, but is also much less expensive.

It will be understood that various other modifications may be made without departing from the invention.

What is claimed is:

1. A method of generating a patterned thin-film circuit of a predetermined thickness on a substrate by vacuum depositing a conductive metal at a selected temperature, which comprises:
   - depositing a glaze frit on the substrate in a pattern that is the negative of the patterned thin-film circuit, said glaze frit comprising glaze-forming inorganic oxide particles, an organic binder, and a solvent vehicle, said glaze frit having an outgassing temperature between 100°–200° C. and a firing temperature above the selected vacuum-depositing temperature, said glaze-frit pattern having (1) a height which is greater than the predetermined thickness of the patterned thin-film circuit and (2) sidewalls which are perpendicular to the surface of the substrate;
   - heating the substrate and said glaze frit to a temperature between 100°–200° C. to outgas and drive off the vehicle to set said glaze frit on the substrate to form said negative glaze-frit pattern of the patterned thin-film circuit;
   - vacuum depositing in a direction perpendicular to the surface of the substrate at the selected temperature a metal layer of the predetermined thickness onto the top of said glaze-frit pattern and the exposed substrate, leaving an unfired glaze frit having an exposed area of discontinuity of said metal layer above the juncture of the sidewalls of said glaze-frit pattern and the surface of the metal layer deposited on the exposed areas of the substrate; and
   - immersing the substrate in a solvent that attacks said glaze frit but which does not attack said metal and the substrate to dissolve said glaze-frit pattern removing the overlying metal.

2. A method of generating a patterned thin-film circuit of a predetermined thickness on a substrate as recited in claim 1, wherein the vacuum-depositing step comprises:
   - sputtering the metal.

3. A method of generating a patterned thin-film circuit of a predetermined thickness on a substrate as recited in claim 1, wherein the vacuum-depositing step comprises:
   - evaporating the metal.

* * * * *

UNITED STATES PATENT OFFICE
CERTIFICATE OF CORRECTION

Patent No. 3,617,373 Dated November 2, 1971

Inventor(s) James H. Mott

It is certified that error appears in the above-identified patent and that said Letters Patent are hereby corrected as shown below:

Column 2, line 16, "on", first occurrence, should read -- of --; line 36, formula should read -- $1 \times 10^{-5}$ mm --. Column 3, line 21, "Attach" should read -- attack --; line 45, "uniform" should read -- tantalum --. Column 4, line 55, "D. Gerstenberg U.S. Pat. No. 3,242,006" should read -- D. Gerstenberg patent 3,242,006 --. Column 5, line 43, "300- to 30,00-" should read -- 300 to 30,000 --. Column 6, line 47, "500°C.C." should read -- 500° C. --. Column 7, line 34, formula should read -- 1.85 $ma/in^2$ --.

Signed and sealed this 30th day of May 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334